United States Patent [19]

Mayes

[11] Patent Number: 5,333,894
[45] Date of Patent: Aug. 2, 1994

[54] WHEEL MOUNTING APPARATUS FOR WHEELCHAIRS

[76] Inventor: Douglas Mayes, 11010 Ayres, Los Angeles, Calif. 90064

[21] Appl. No.: 62,194

[22] Filed: May 17, 1993

[51] Int. Cl.⁵ ................. B62D 17/00; B62M 1/14
[52] U.S. Cl. ................. 280/661; 280/250.1; 280/304.1
[58] Field of Search ........... 280/242.1, 661, 304.1, 280/250.1; 297/DIG. 4

[56] References Cited

U.S. PATENT DOCUMENTS

| | | | |
|---|---|---|---|
| 774,042 | 11/1904 | Cooper | 280/661 X |
| 2,772,596 | 12/1956 | Trussell | |
| 3,401,981 | 9/1968 | Adams | |
| 4,405,142 | 9/1983 | Whetstine | |
| 4,489,995 | 12/1984 | Hamilton | 280/242.1 |
| 4,500,102 | 2/1985 | Haury et al. | 280/242.1 |
| 4,595,212 | 6/1986 | Haury et al. | 280/242.1 |
| 4,595,216 | 6/1986 | Ware | 280/661 |
| 4,684,150 | 8/1987 | Specktor et al. | 280/661 |
| 4,768,797 | 9/1988 | Friedrich | 280/661 X |
| 4,836,574 | 6/1989 | Ingalls | 280/661 |
| 4,863,187 | 9/1989 | Artz | 280/661 |
| 5,060,962 | 10/1991 | McWethy | 280/304.1 |
| 5,110,151 | 5/1992 | Blechschmidt et al. | 280/661 |
| 5,131,672 | 7/1992 | Robertson et al. | 280/250.1 |

FOREIGN PATENT DOCUMENTS

| | | | |
|---|---|---|---|
| 1125148 | 11/1984 | U.S.S.R. | 280/661 |
| 1604014 | 12/1981 | United Kingdom | 280/661 |

*Primary Examiner*—Margaret A. Focarino
*Assistant Examiner*—Carla Mattix
*Attorney, Agent, or Firm*—David Weiss

[57] ABSTRACT

Apparatus for precisely, rigidly and releasably mounting the drive wheels to a wheelchair while imparting customized camber and toe adjustments to the wheels. A pair of precisely fixed surfaces integral with the wheelchair frame imparts a predetermined base camber to the drive wheels, and interchangeable members are provided for imparting smaller preselected adjustments to the large base camber and for mounting the wheels to the frame with camber angles equal to the base camber as adjusted by the interchangeable members. The interchangeable members may also include preselected toe adjustments to be imparted to the mounted wheels.

13 Claims, 2 Drawing Sheets

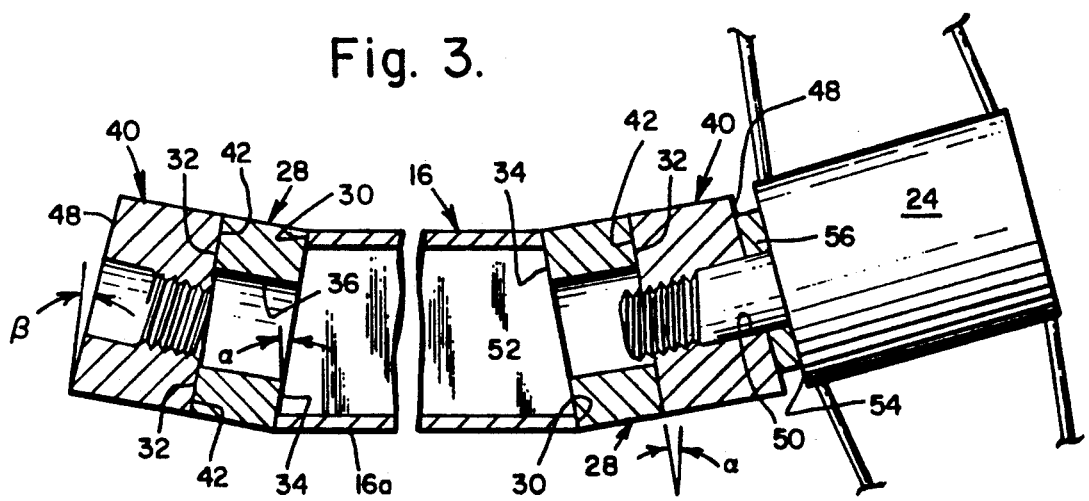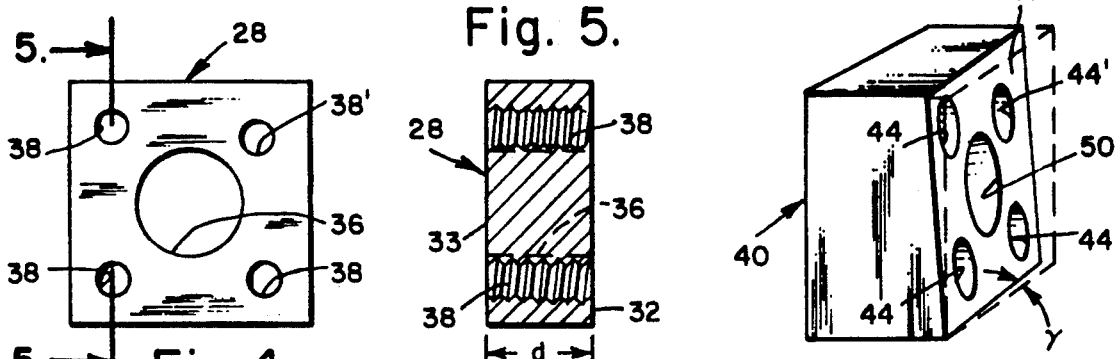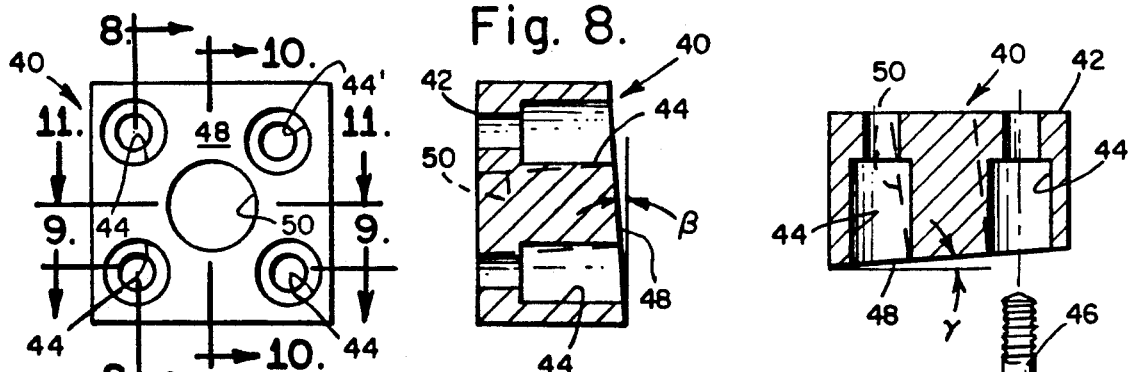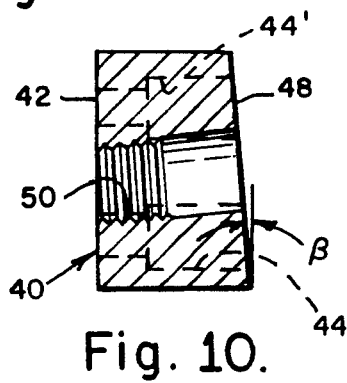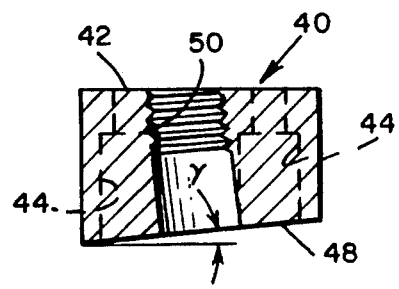

5,333,894

WHEEL MOUNTING APPARATUS FOR WHEELCHAIRS

BACKGROUND OF THE INVENTION

This invention relates to wheelchairs, and more particularly to apparatus for mounting the drive wheels of wheelchairs while imparting customized camber and toe adjustments to such wheels, and in particular to the wheels of sports wheelchairs.

The use of wheelchairs for permitting participation of physically disabled persons in various sports activities has resulted in the need for wheelchairs having improved operational characteristics. At the same time, the optimization of such improvements varies with the requirements of the specific sports activity and the physical characteristics and capabilities of the wheelchair occupant. Such considerations are of particular concern with respect to wheelchair stability and maneuverability, characteristics which are determined in some measure by the positional relationship of the two large drive wheels of the wheelchair and the extent by which camber and toe of such wheels may be customized while maintaining structural integrity of the chair.

The typical wheelchair includes a frame to which two large drive wheels (generally hand-driven) are mounted for rotation, one on each side of the frame for supporting the frame along with one or two smaller front wheels. The larger drive wheels are generally set closer together at the top than at the bottom, a characteristic referred to as "camber". These rear drive wheels may be set so that they are closer together at the front than at the back, a condition known as "toe-in", whereas adjustment of the wheels so that they are closer together at the back than at the front is known as "toe-out"; as used herein, "toe" refers to toe-in and/or toe-out.

In the past, camber adjustments have been imparted to the drive wheels of sports wheelchairs by means of devices which are removably attached to the frame for imparting the full measure of the preselected camber to the wheels.

SUMMARY OF THE INVENTION

In accordance with the present invention, apparatus is provided for imparting camber and toe to the drive wheels of the wheelchair, wherein a large initial or base predetermined camber to be imparted to the drive wheels is provided by precisely fixed means integral with the wheelchair frame. Interchangeable members are provided for making small preselected adjustments to the large initial or base camber, and for mounting the wheels to the frame at camber angles equal to the base camber as adjusted by the interchangeable members. The interchangeable members may also include preselected toe adjustments to be imparted to the mounted wheels.

Briefly described, in a wheelchair having a pair of drive wheels, the apparatus of the invention comprises in combination: a frame; base camber means integral with the frame for imparting a base camber to the wheels when the wheels are mounted to the frame; and adjustment means removably securable to the base camber means for mounting the wheels to the frame and for imparting a camber adjustment to the base camber imparted to the wheels by the base camber means. The adjustment means includes a plurality of interchangeable adjustment members for imparting respectively different camber adjustments to the base camber imparted to the wheels by the base camber means. The adjustment means may further include means for imparting a toe adjustment to the wheels when the wheels are mounted to the frame by the adjustment means, and in such case the adjustment means may include a plurality of interchangeable adjustment members for imparting the same camber adjustment to the base camber and respectively different toe adjustments to the wheels.

From another aspect thereof, in a wheelchair having a pair of drive wheels, the apparatus of the invention comprises in combination: a wheelchair frame having a pair of inwardly sloped surfaces situated on opposite sides of the frame; a pair of adjustment members each removably securable to the frame and having one surface for engaging a one of the inwardly sloped surfaces when secured to the frame, each adjustment member including wheel mounting means disposed relative to the one surface of such adjustment member for mounting one of the wheels to the adjustment member secured to the frame such that the mounted wheel is imparted a camber determined by the slope of the one inwardly sloped surface of the frame. The adjustment member when secured to the frame imparts to the wheel when mounted to the adjustment member a camber deviating from the slope of the inwardly sloped surface of the frame by a preselected angle determined by the disposition of the wheel mounting means relative to the one surface of the adjustment member. The wheel mounting means of the mounting member may be further disposed relative to the one surface of the mounting member for providing a toe angle to the wheel when mounted to the mounting member secured to the frame.

In accordance with another consideration of the present invention, the apparatus comprises, in a wheelchair having a pair of drive wheels each including a hub and an axle, the combination of a wheelchair frame including a laterally extending longitudinal member having two ends; end members respectively rigidly secured to the ends of the longitudinal member, each end member having an end surface of predetermined inward slope; and a pair of adjustment members, each adjustment member having first and second substantially opposite surfaces disposed relative to one another by a preselected angle, each such adjustment member removably securable to a one of the end members with the first surface engaging the end surface and the second surface disposed relative to the end surface by such preselected angle, each mounting member including mounting means for mounting one of the wheels to the mounting member with the axle perpendicular to the second surface for imparting camber to the mounted wheel equal to the slope of the end member adjusted by such preselected angle. The mounting means includes a bore in the adjustment member perpendicular to the second surface for removably receiving the wheel axle, and for causing the wheel hub to engage the second surface when the wheel axle is received by the bore. The second surface of each adjustment member may be further disposed relative to the first surface by a further preselected angle in a plane orthogonal to the plane of the preselected camber adjustment angle, for imparting a toe adjustment to the mounted wheels. The system of the present invention includes additional pairs of interchangeable adjustment members, such additional pairs having second surfaces with respectively different preselected angles for imparting respectively different camber adjustments to the mounted wheels. The system further includes other additional pairs of interchangeable adjustment members, such other additional pairs having second surfaces with respectively different further preselected angles for imparting different toe adjustments to the mounted wheels.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

FIG. 3 is a fragmentary cross-sectional, front elevational view of the wheel mounting and camber/toe adjustment apparatus of the present invention illustrated in FIGS. 1 and 2, taken along line 3—3 of FIG. 2 in the direction of the appended arrows with the left drive wheel (as viewed in the drawing) removed;

FIG. 4 is an end view of an end member included in the preferred embodiment of the present invention;

FIG. 5 is a cross-sectional view of the end member of FIG. 4, taken along the line 5—5 in the direction of the appended arrows;

FIG. 6 is a perspective view of an adjustment member included in the preferred embodiment of the present invention;

FIG. 7 is an end view of the adjustment surface of the member of FIG. 6;

FIG. 8 is a cross-sectional view of the adjustment member of FIG. 6, taken along the line 8—8 of FIG. 7 in the direction of the appended arrows;

FIG. 9 is a cross-sectional view of the adjustment member of FIG. 6, taken along the line 9—9 of FIG. 7 in the direction of the appended arrows, shown with an example of a shoulder bolt for securing the adjustment member to the end member;

FIG. 10 is a cross-sectional view of the adjustment member of FIG. 6, taken along the line 10—10 of FIG. 7 in the direction of the appended arrows; and FIG. 11 is a cross-sectional view of the adjustment member of FIG. 6, taken along the line 11—11 of FIG. 7 in the direction of the appended arrows.

DETAILED DESCRIPTION OF THE PREFERRED EMBODIMENT

Figure 1:
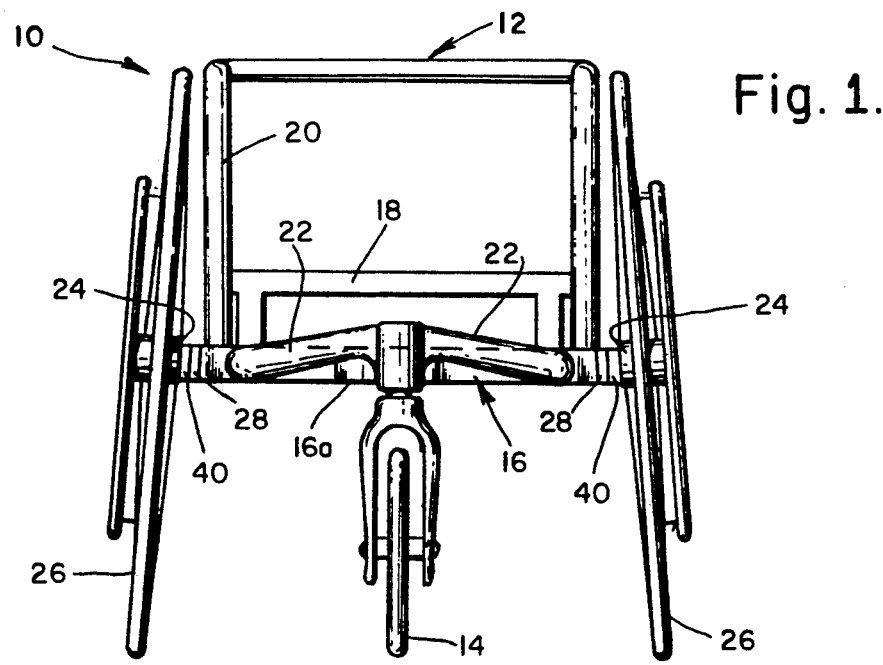
FIG. 1 is a front elevation view of one type of wheelchair employing a preferred embodiment of the present invention.
Figure 2:
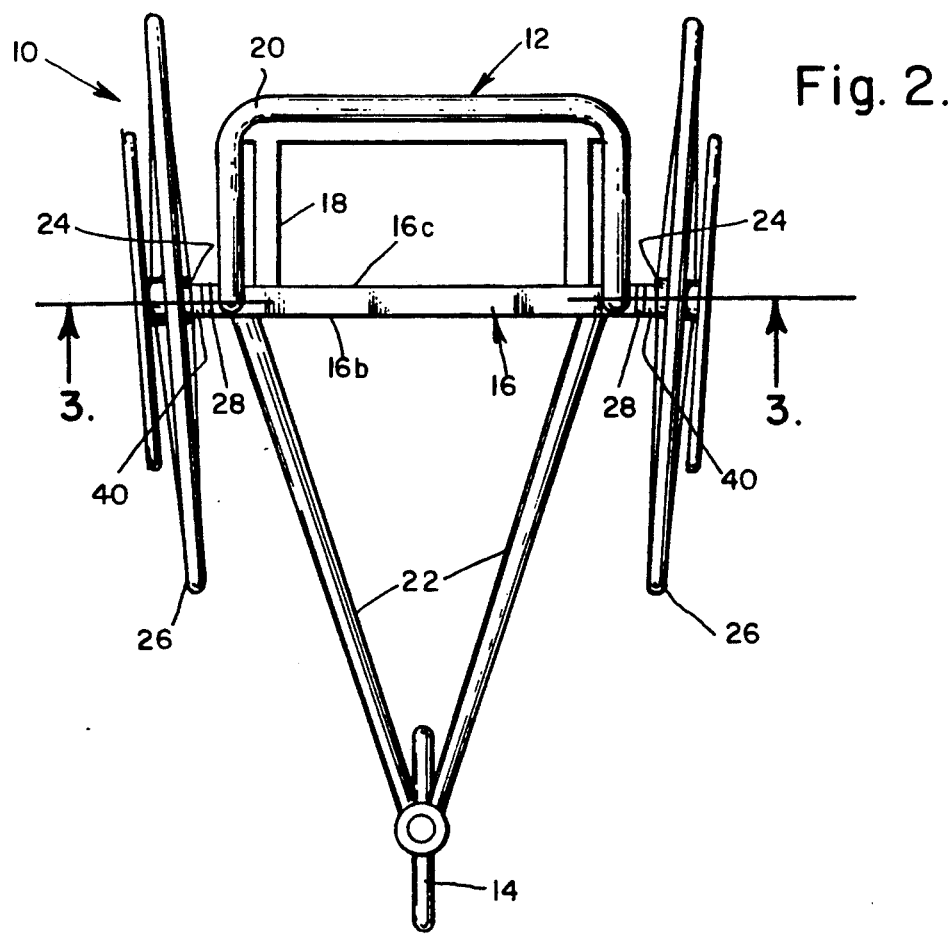
FIG. 2 is a top plan view of the wheelchair of FIG. 1.

One type of a sports wheelchair 10 is illustrated in FIGS. 1 and 2, and for clarity of illustration is shown without its seat and foot-rest assemblies normally supported by or secured to the chair's structural frame 12. The wheelchair 10 shown is of a type having particular applicability to racing, such as for use in marathon races, and has one front wheel 14 although more common wheelchairs having two front wheels may advantageously utilize the apparatus of the present invention.

In the preferred embodiment of the present invention, a horizontally disposed longitudinal member 16 is an integral part of the frame 12. Various other structural elements 18, 20, 22 of the frame 12 are rigidly secured to the longitudinal member 16, preferably by being welded directly or indirectly to the longitudinal member 16 for establishing the structural integrity of the frame 12. The longitudinal member 16 is laterally disposed and aligned for mounting engagement with the hubs 24 of the chair's two large drive wheels 26. The wheels 26 are removably mounted to the wheelchair frame 12 and are precisely fixed with respect to one another, by means of the apparatus of the present invention, such that they exhibit a preselected camber as shown in FIG. 1 and may further exhibit a preselected toe as shown by the toe-in of the drive wheels in FIG. 2.

Turning to FIGS. 3-11, there is shown the preferred apparatus for so mounting the drive wheels with preselected camber and toe. FIG. 3 shows the longitudinal member 16 as a metal tube, which may be of rectangular cross-section with its flat bottom side 16a disposed in a horizontal plane when the wheels 14, 26 are on a horizontal surface. A pair of mirror-image metal end members or blocks 28 are respectively rigidly secured, as by welding, to the ends or extremities 30 of the tube 16, such that each end block's planar laterally outward end surface 32 is inwardly sloped by a predetermined angle $\alpha$ from vertical when when the wheels 14, 26 are on a horizontal surface. The vertical front and rear sides 16b, 16c of the rectangular tube 16 are cut such that each of the tube extremities 30 is inwardly sloped by the angle $\alpha$, as shown in FIG. 3. Each end block 28 of the pair of end blocks 28 have equal and constant depth d (see FIG. 5), and the generally inwardly facing or inner planar surface 34 of the end blocks 28 bears against and is rigidly secured by welding to the respective angled tube extremities 30, so that the predetermined inward slope angle $\alpha$ of the tube extremities 30 is carried forward to the planar end surface 32 of each end block 28 which is parallel to the block's inner surface 34. Each end member 28 includes a central bore 36, as well as four threaded bores 38, 38' arranged around the central bore 36, extending through the end member's depth d and perpendicular to the end surface 32 (FIGS. 3-5).

At least one pair of mirror-image adjustment members or blocks is provided by the present invention, and preferably a plurality of interchangeable pairs of mirror-image adjustment members or block are provided. One such adjustment block 40, shown in FIG. 6, is one of a pair of such blocks 40 illustrated in FIG. 3. Each adjustment block 40 is provided with a first planar surface 42 for mating or being in contact engagement with the planar end surface 32 of an end block 28. Tile adjustment block's first surface 42 is preferably of the same rectangular dimensions as the end block's end surface 32, and each adjustment block 40 is provided with four bores 44, 44' perpendicularly disposed with respect to the adjustment block's first planar surface 42 and arranged for axial correspondence with the four threaded bores 38, 38' of an end block 28. An adjustment block 42 is removably secured to an end member 28, with their respective planar surfaces 42, 32 in mating or contact engagement (as shown in FIG. 3) by means of four shoulder bolts 46 representatively shown in FIG. 9. One of the threaded bores 38' of each end block 28 is offset with respect to the other bores 38 and the central bore 36, and one of the bores 44' of each adjustment block 40 is similarly offset with respect to the other bores 44, so that only one adjustment block 40 (of a pair of adjustment blocks 40) may be properly secured to only one of the two end blocks 28 (of the pair of end blocks 28), i.e. a left adjustment block 40 (of a pair of right and left adjustment blocks) may be secured only to a left end block 28 and a right adjustment block 40 may be secured only to a right end block 28.

Each adjustment block 40 includes a second planar surface 48 substantially opposite the adjustment block's first planar surface 42 and disposed relative to such first planar surface 42 by a first preselected angle $\beta$ in a first plane and by a second preselected angle $\gamma$ in a second plane orthogonal to the first plane. When an adjustment block 40 is properly secured to an end block 28 as described above and the chair's wheels 14, 26 are on a horizontal surface (i.e., the flat bottom side 16a of the rectangular tube 16 is disposed in a horizontal plane facing the horizontal surface), the adjustment block's second planar surface 48 is disposed relative to the adjustment block's first planar surface 42 by the first preselected angle $\beta$ in the vertical plane and by the second preselected angle $\gamma$ in the horizontal plane.

Each adjustment block 40 includes a threaded bore 50 therethrough perpendicularly disposed with respect to the adjustment block's second planar surface 48, for mounting a drive wheel to the adjustment block 40 by receiving a threaded axle spindle 52 of the hub 24 of one of the drive wheels 26. The received spindle 52 draws the inner flat surface 54 of the hub 24 against the adjustment block's compound-angled second surface 48 through an intermediate washer 56. In such manner, the two drive wheels 26 are releasably mounted to the wheelchair frame 12 and are disposed in respective planes parallel to the plane of the second surface 48 of the adjustment block 40 by which the wheel 26 is mounted.

The first preselected angle $\beta$ of the second surfaces 48 of the secured adjustment blocks 40 is additive to the predetermined angle $\alpha$ of the end surfaces 32 of the end blocks 28, producing an inward slope of the adjustment block second surfaces 48—and similarly an inward slope or camber of the mounted drive wheels 26—equal to the sum of the angles $\alpha$ and $\beta$, while the toe of the wheels 26 set by tile adjustment block second surfaces 48 is equal to the angle $\gamma$.

The tube 16 and the end blocks 28 of the welded frame 12 are preferably of aluminum, as are the adjustment blocks 40. The diameter of the central bore 36 of each of tile end blocks 28 is sufficiently great so that the angled hub axle 52 is not prevented from being fully received by the bore 50 of an adjustment block 40. It may be appreciated that the two opposite end surfaces 32 describing the predetermined angle $\alpha$ are rigidly and precisely set with respect to one another by means of their respective end members' 28 being welded to opposite ends of the lateral tube 16 and integral with the frame 12, creating the structural foundation for rigidly linking the two drive wheels 26.

It may be further appreciated that, by means of the present invention, the integral end surfaces 32 of the wheelchair frame 12 provide a substantial initial or base camber (which is most of the camber to be imparted) to the drive wheels 26 which may be customized to the particular wheelchair user and the particular sport in which the chair is to be primarily utilized, while the adjustment blocks 40 are provided for making a further (and smaller) adjustment to the permanently set large base camber in further customization to the user. This combination, as well as the provision for toe adjustment being effected by the same adjustment member surface 48 as the camber adjustment, provides precise camber and toe control for improved wheelchair stability and maneuverability.

For example, a wheelchair may be customized for a particular individual and sport with welded end blocks 28 which provide for, say, a 10° base camber which is appropriate for marathon racing. At the same time, the welded end blocks 28 may provide for no toe-in or toe-out, and the wheelchair may be equipped with one pair of installed adjustment blocks 40 in which the first and second surfaces 42, 48 are parallel to one another (i.e., the angles $\beta$ and $\gamma$ are each 0°), so that the drive wheels would have a 10° camber and no toe. The optimum amounts of camber and toe adjustments are determined by the wheelchair user, and the present invention permits camber and toe to be changed as desired. A plurality of pairs of adjustment blocks 40 may be provided, with each pair having compound-angled second surfaces 48 with respectively different preselected angles $\beta$ and $\gamma$. If a user desires a 12° camber and a 10 minute toe-in, he/she would select a pair of adjustment blocks from the set in which the second surfaces 48 have a compound angle representing 2 degrees additional camber ($\beta$) and 10 minutes toe-in ($\gamma$). He/she would remove the wheels from the chair, as well as the previously installed pair of adjustment blocks 40, by unscrewing the four shoulder or cap screws 46, and he/she would then install the selected new pair of adjustment blocks 40 to the end blocks 28 by means of the cap screws. The drive wheels 26 would then be replaced by screwing their spindles 56 into the newly installed adjustment blocks 40.

If a user specifies a particular camber but desires to experiment with different toe angles, he/she may be provided with a plurality of adjustment blocks 40 having the same camber adjustment angle $\beta$ but different toe adjustment angles $\gamma$. For example, if a user specifies 12° camber, he may be provided with a set of, say, five pairs of adjustment blocks 40, each pair having a 2° camber adjustment angle $\beta$, but the toe adjustment angle $\gamma$ may vary with each pair from 0 to 20 minutes toe-in at 5 minute intervals.

Adjustment blocks 40 may be provided with negative camber adjustment angles $\beta$ for decreasing the camber from the large base camber angle $\alpha$; for example, a pair of adjustment blocks 40 with a negative 2° angle $\beta$ would impart an 8° camber to the drive wheels 26 when secured to end blocks 28 having a predetermined 10° base camber angle $\alpha$. Similarly, toe-out may be provided by adjustment blocks 40 having a negative toe angle $\gamma$; for example, a pair of adjustment blocks 40 having a negative toe adjustment angle $\gamma$ of 5 minutes would impart a 5 minute toe-out to the drive wheels 26.

Thus, there has been described apparatus for precisely, rigidly and releasably mounting the drive wheels of wheelchairs while imparting customized camber and toe adjustments to such wheels. Other embodiments of the present invention, and modifications the embodiment herein presented, may be developed without departing from the essential characteristics thereof. Accordingly, the invention should be limited only by the scope of the claims listed below.

I claim:

1. In a wheelchair having a pair of drive wheels, apparatus comprising in combination:
   a frame;
   base camber means integral with said frame for imparting a base camber to the wheels deviating from 0° camber when the wheels are mounted to said frame; and adjustment means removably securable to said base camber means for mounting the wheels to said frame and for imparting a camber adjustment to the base camber imparted to the wheels by said base camber means.

2. The apparatus according to claim 1, wherein:
said adjustment means includes means for imparting a toe adjustment to the wheels when the wheels are mounted to said frame by said mounting means.

3. The apparatus according to claim 1, wherein:
said adjustment means includes a plurality of interchangeable adjustment members for imparting respectively different camber adjustments to the base camber imparted to the wheels by said base camber means.

4. The apparatus according to claim 1, wherein:
said adjustment means includes a plurality of interchangeable adjustment members for imparting the same camber adjustment to the base camber and respectively different toe adjustments to the wheels.

5. In a wheelchair having a pair of drive wheels each including a hub and an axle, apparatus comprising in combination:
a wheelchair frame including a laterally extending member having two ends;
end members respectively rigidly secured to said ends of said laterally extending member, each end member having an end surface of predetermined inward slope;
a pair of adjustment members, each said adjustment member having first and second substantially opposite surfaces disposed relative to one another by a first preselected angle, each said adjustment member removably securable to a respective one of said end members with said first surface engaging said end surface and said second surface disposed relative to said end surface by said first preselected angle, each said adjustment member including mounting means for mounting a respective one of the wheels to said adjustment member with its axle perpendicular to said second surface for imparting camber to the mounted wheel equal to the slope of said end member surface adjusted by said first preselected angle of said adjustment member second surface.

6. The apparatus according to claim 5, wherein:
said mounting means includes a bore in said adjustment member perpendicular to said second surface for removably receiving the wheel axle.

7. The apparatus according to claim 6, wherein:
said mounting means causes the wheel hub to engage said second surface of said adjustment member when the wheel axle is received by said bore.

8. The apparatus according to claim 5, wherein:
said second surface of each said adjustment member is further disposed relative to said first surface by a second preselected angle in a plane orthogonal to the plane of said first preselected angle for imparting a toe adjustment to the mounted wheels.

9. The apparatus according to claim 5, further including:
additional pairs of adjustment members interchangeable with said pair, said additional pairs having second surfaces with respectively different first preselected angles for imparting respectively different camber adjustments to the mounted wheels.

10. The apparatus according to claim 5, further including:
additional pairs of adjustment members interchangeable with said pair, said additional pairs having surfaces with respectively different second preselected angles for imparting respectively different toe adjustments to the mounted wheels.

11. The apparatus according to claim 5, wherein:
said laterally extending member is a longitudinal member.

12. In a wheelchair having a pair of drive wheels, apparatus comprising in combination:
a wheelchair frame having a pair of inwardly sloped surfaces situated on opposite sides of said frame; and
a pair of adjustment members each removably securable to said frame and having one surface for engaging a respective one of said inwardly sloped surfaces when secured to said frame, each said adjustment member including wheel mounting means disposed relative to its said one adjustment member surface for mounting one of the wheels to said adjustment member secured to said frame such that the mounted wheel is imparted a camber determined by the slope of said one inwardly sloped surface of said frame, and wherein said adjustment member when secured to said frame imparts to the wheel when mounted to said adjustment member a camber deviating from the slope of said inwardly sloped surface of said frame by a preselected angle determined by the disposition of said wheel mounting means relative to said one surface of said adjustment member.

13. In a wheelchair having a pair of drive wheels, apparatus comprising in combination:
a wheelchair frame having a pair of inwardly sloped surfaces situated on opposite sides of said frame; and
a pair of adjustment members each removably securable to said frame and having one surface for engaging a respective one of said inwardly sloped surfaces when secured to said frame, each said adjustment member including wheel mounting means disposed relative to its said one adjustment member surface for mounting one of the wheels to said adjustment member secured to said frame such that the mounted wheel is imparted a camber determined by the slope of said one inwardly sloped surface of said frame, said wheel mounting means of said adjustment member being further disposed relative to said one surface of said adjustment member for providing a toe angle to the wheel when mounted to said adjustment member secured to said frame.

* * * * *